United States Patent
Nelluri et al.

(10) Patent No.: US 12,518,459 B2
(45) Date of Patent: Jan. 6, 2026

(54) FINANCIAL DISSEMINATION AVATAR SYSTEM

(71) Applicant: Wells Fargo Bank, N.A., San Francisco, CA (US)

(72) Inventors: Govinda Rajulu Nelluri, Hyderabad (IN); Manivasagan Ramamoorthy, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 120 days.

(21) Appl. No.: 18/644,978

(22) Filed: Apr. 24, 2024

(65) Prior Publication Data

US 2025/0336133 A1    Oct. 30, 2025

(51) Int. Cl.
    *G06T 13/40*    (2011.01)
    *G06Q 40/08*    (2012.01)

(52) U.S. Cl.
    CPC ............ *G06T 13/40* (2013.01); *G06Q 40/08* (2013.01)

(58) Field of Classification Search
    CPC ............................... G06T 13/40; G06Q 40/08
    See application file for complete search history.

(56) References Cited

U.S. PATENT DOCUMENTS

| | | | |
|---|---|---|---|
| 11,544,807 B1 | 1/2023 | Breitweiser | |
| 2019/0251575 A1 | 8/2019 | Berti | |
| 2022/0198562 A1 | 6/2022 | Cella | |
| 2023/0267694 A1* | 8/2023 | Breitweiser | G06Q 40/08 345/633 |
| 2023/0281743 A1 | 9/2023 | Breitweiser | |
| 2025/0131500 A1* | 4/2025 | Degenhardt | G06Q 40/06 |

FOREIGN PATENT DOCUMENTS

| | | |
|---|---|---|
| KR | 2022014052 A | 2/2022 |
| WO | 2019119619 A1 | 6/2019 |

OTHER PUBLICATIONS

Yusen, Xu, et al., Digital Twin Concept in Managing Industrial Capital Construction Projects Life Cycle, 2018 Eleventh International Conference "Management of large-scale system development," MLSD, Moscow, Russia, 2018, 4 pages, doi: 10.1109/MLSD.2018.8551867.

* cited by examiner

*Primary Examiner* — Chong Wu
(74) *Attorney, Agent, or Firm* — Merchant & Gould P.C.

(57) ABSTRACT

Examples described provide systems and methods provided that include creation of financial avatars in a metaverse representing an insured person, beneficiaries and beneficial activities to be carried out in the event of the insured person's demise or other predefined trigger event. An intervener avatar executes all of the intended beneficial activities on behalf of the insured person to the rightful beneficiaries and/or integral products. Upon successful completion of the beneficial activity, the intervener avatar causes the financial avatars to be disintegrated or erased from the metaverse.

20 Claims, 5 Drawing Sheets

FINANCIAL DISSEMINATION AVATAR SYSTEM

BACKGROUND

Many individuals have insurance policies with sums of money intended to be paid out to beneficiaries upon an individual's death or upon another event (e.g., a beneficiary turning 18) following the individual's death. However, there are difficulties both in the ability for the insured individual to dictate how and when insurance proceeds will be disseminated and in the ability of a beneficiary to claim or be aware of the existence of such proceeds. For example, the claims process for beneficiaries is highly manual and generally requires the beneficiary to contact the insurance company. However, the beneficiary may not be aware of the conditions for when the proceeds should be paid out, the particular company holding the insurance or even that any insurance exists in the first place. As such, there is a continual growing of the amount of unclaimed insurance funds that should be paid out to beneficiaries.

SUMMARY

Examples described herein include creation of financial avatars in a metaverse representing an insured person, beneficiaries and beneficial activities to be carried out in the event of the insured person's demise or other predefined trigger event. An intervenor avatar executes all of the intended beneficial activities on behalf of the insured person to the rightful beneficiaries and/or integral products. Upon successful completion of the beneficial activity, the intervener avatar causes the financial avatars to be disintegrated or erased from the metaverse.

According to a first aspect, a method includes receiving information relating to an insured person, the information including one or more beneficiaries and one or more beneficial activities to be carried out on behalf of the one or more beneficiaries upon occurrence of one or more trigger events. Financial avatars can be generated in a metaverse system representing the insured person, the one or more beneficiaries and the one or more beneficial activities. An indication that one of the one or more trigger events corresponding to at least one beneficial activity to be carried out on behalf of at least one beneficiary has occurred can be received. An intervenor probing avatar can be created in the metaverse system in response to occurrence of the trigger event. The at least one beneficial activity can be executed on behalf of the at least one beneficiary corresponding to the trigger event with the intervenor probing avatar. The financial avatars corresponding to the at least one beneficial activity and at least one beneficiary in the metaverse system can be modified following execution of the at least one beneficial activity.

The at least one beneficial activity can be a one-time activity, and modifying the financial avatar corresponding to the at least one beneficial activity can include erasing the financial avatar from the metaverse system. The at least one beneficial activity can be a recurring activity, and modifying the financial avatar corresponding to the at least one beneficial activity can include gradually disintegrating the financial avatar from the metaverse system at a rate proportional to the execution of the recurring activity. Modifying the financial avatar corresponding to the at least one beneficiary can include erasing the financial avatar from the metaverse system. The method can further determine that the at least one beneficiary is entitled to at least one further beneficial activity, and generate an updated financial avatar corresponding to the at least one beneficiary reflecting the trigger event and/or the at least one beneficial activity executed in response to the trigger event. Upon execution of all beneficial activities to all beneficiaries, the financial avatar corresponding to the insured person can be erased from the metaverse system. Each financial avatar corresponding to a beneficial activity can include smart contractual information for executing the beneficial activity on behalf of the one or more beneficiaries corresponding to the beneficial activity. The intervenor probing avatar can access the smart contractual information to automatically execute the beneficial activity upon occurrence of the trigger event. Information pertaining to the trigger event can be received through distributed ledger technology. Information pertaining to the at least one beneficial activity can be communicated to the at least one beneficiary.

A system according to a second aspect disclosed herein can include a processor and a computer-readable medium storing instructions that, when executed by the processor, cause the system to a) receive information relating to an insured person, the information including one or more beneficiaries and one or more beneficial activities to be carried out on behalf of the one or more beneficiaries upon occurrence of one or more trigger event, b) generate in a metaverse system financial avatars representing the insured person, the one or more beneficiaries and the one or more beneficial activities, c) receive an indication that one of the one or more trigger events has occurred, the trigger event corresponding to at least one beneficial activity to be carried out on behalf of at least one beneficiary, d) create an intervenor probing avatar in the metaverse system in response to occurrence of the trigger event, e) execute the at least one beneficial activity on behalf of the at least one beneficiary corresponding to the trigger event with the intervenor probing avatar, and f) modify the financial avatars corresponding to the at least one beneficial activity and at least one beneficiary in the metaverse system following execution of the at least one beneficial activity.

If the at least one beneficial activity is a one-time activity, the system can modify the financial avatar corresponding to the at least one beneficial activity by erasing the financial avatar from the metaverse system. If the at least one beneficial activity is a recurring activity, and the system can modify the financial avatar corresponding to the at least one beneficial activity by gradually disintegrating the financial avatar from the metaverse system at a rate proportional to the execution of the recurring activity. The system can modify the financial avatar corresponding to the at least one beneficiary by erasing the financial avatar from the metaverse system. The system can determine that the at least one beneficiary is entitled to at least one further beneficial activity, and generate an updated financial avatar corresponding to the at least one beneficiary reflecting the trigger event and/or the at least one beneficial activity executed in response to the trigger event. The system can, upon execution of all beneficial activities to all beneficiaries, erase the financial avatar corresponding to the insured person from the metaverse system. Each financial avatar corresponding to a beneficial activity can include smart contractual information for executing the beneficial activity on behalf of the one or more beneficiaries corresponding to the beneficial activity. The intervenor probing avatar can access the smart contractual information and automatically execute the beneficial activity upon occurrence of the trigger event. The system can receive information pertaining to the trigger event through distributed ledger technology. The system to communicate information pertaining to the at least one beneficial activity to the at least one beneficiary.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Disclosed herein is a function that enables an insured individual to define beneficial activities (e.g., mortgage pre-closure/prepayment, medical expenses, child tuition, payout of funds), beneficiaries (spouse, children, parents), and corresponding trigger events (death, claim, maturity, dependent's life events) within a metaverse system. Financial avatars are created in the metaverse, which are digital twins representing the insured person, beneficial activities, and the beneficiaries.

Upon the occurrence of a triggering event, an intervenor probing avatar is created and responsible for assessing and executing smart contractual information that is stored in a beneficial activities avatar towards beneficiary avatars on behalf of an insured person avatar. The intervening probing avatar, on completing the execution of the smart contracts that are of a one-time settlement nature (like mortgage pre-closure/prepayment), will erase the corresponding financial avatars (insured person avatar, beneficiary avatar, and the beneficial activity avatar) from the metaverse system. For smart contracts of a recurring nature (like children tuition fee), the intervener probing avatar will gradually disintegrate and decompose the corresponding financial avatars from the metaverse system at a rate that is proportional to the execution/dissemination of the beneficial activity (i.e., the duration of payment of children tuition).

The financial avatar system described herein can, in one implementation, include three distinct phases: 1) a Declaration Phase, 3) a Deliverance Phase and 3) a Dissemination phase.

In the Declaration Phase, the insured individual or individuals enter a record of beneficial activities (mortgage pre-closure/prepayment, medical expenses, child tuition, etc.), beneficiaries (spouse, children, parents, etc.) and corresponding trigger events (death, claim, maturity, dependent's life events) in the financial dissemination avatar system.

The deliverance phase includes the creation of the financial avatars in the metaverse. The financial avatars are digital twins created in the metaverse representing the insured person, beneficial activities and the beneficiaries. The number of financial avatars that are created is directly proportional to the number of beneficiaries and beneficial activities.

The Dissemination Phase is initiated on the occurrence of a trigger event and includes creation of the intervenor proving avatar that is responsible for assessing and executing the smart contractual information that is stored in the beneficial activities avatar towards the beneficiary avatars on behalf of the insured person avatar. The Dissemination Phase also includes the erasing of the corresponding avatars upon completing the execution of smart contracts that are of a one-time settlement nature and gradual disintegration and decomposition of the corresponding avatars for recurring smart contracts at a rate that is proportional to the execution/dissemination of the beneficial activity.

The drawings depict elements of this disclosure for a more complete understanding of the financial avatar system disclosed herein.

Figure 1:
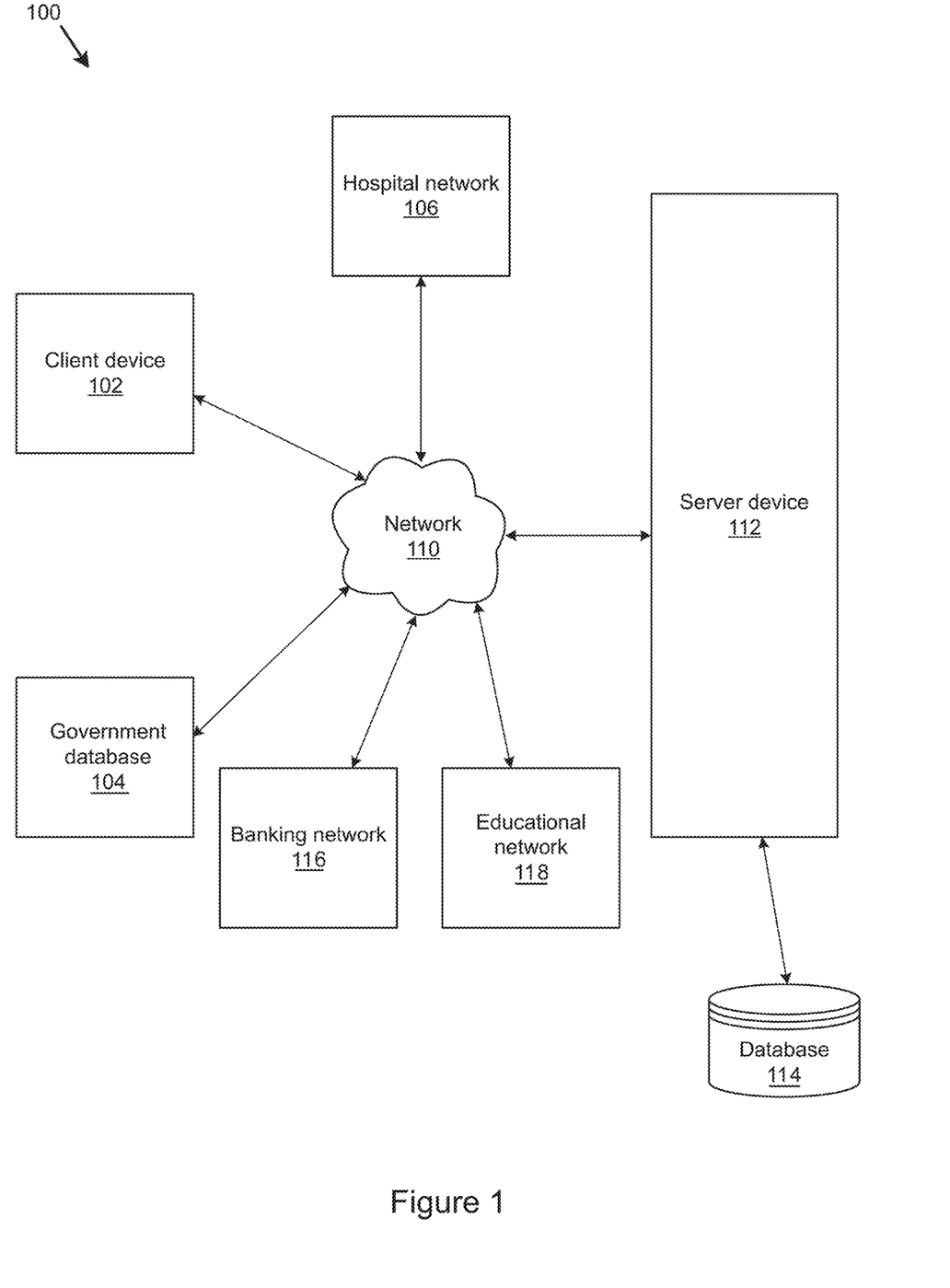
FIG. 1 depicts an exemplary system for providing a financial avatar dissemination function.

An exemplary system 100 for providing a financial dissemination avatar function is depicted in FIG. 1. A client device 102 can be in communication with a server device 112 over a network 110. Client device 102 can be, for example, a laptop computer, desktop computer or other computing device. Server device 112 can store and transmit information for the financial dissemination avatar system, some or all of which may reside in one or more databases 114 accessible to server device 112, to the client device 102 over network 110. One or more third party devices can be in communication with the client device 102 and/or server device 112 and/or each other over network 110. These systems can include for example, one or more government databases 104 (e.g., a social security number database), a hospital network 106, a banking network 116 and an educational network 118.

In embodiments, system 100 can leverage distributed ledger technology, which is a peer-to-peer digital system for recording transactions between multiple nodes at the same time. For example, financial events occurring over the banking network 116, medical events occurring over the hospital network 106 and educational events occurring over the educational network 118 can all be recorded in a ledger accessible to all nodes of the system over the network 110. Server device 112 operating the financial dissemination avatar system disclosed herein can therefore automatically detect and access trigger events relevant to dissemination of an insured person's assets. For example, if an individual dies, the hospital network 106 can update the ledger to indicate that the individual is deceased, which will trigger the server device 112 to carry out the beneficial activities corresponding to that trigger event.

Figure 2:
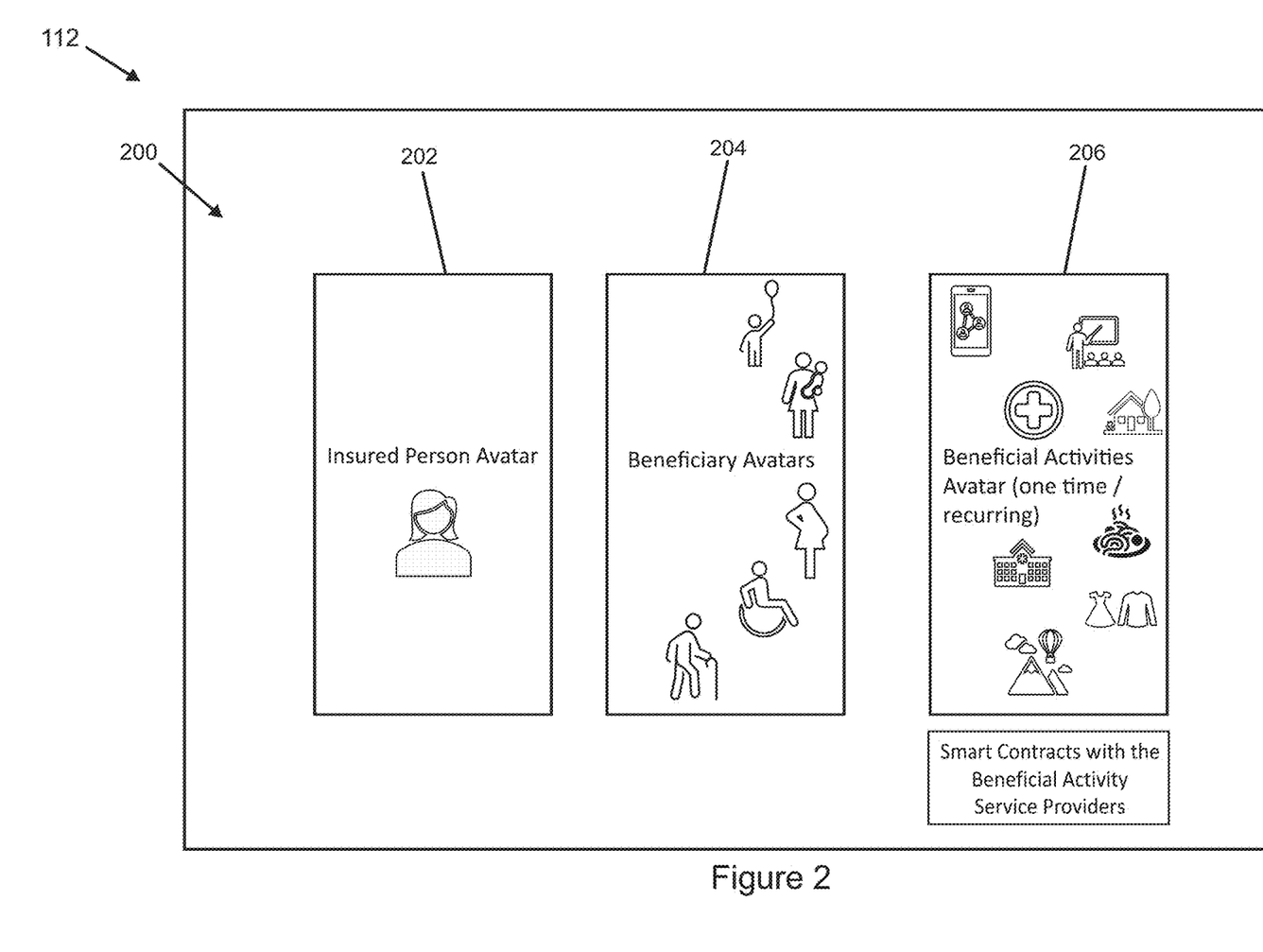
FIG. 2 depicts exemplary components of the server device of the system of FIG. 1.

FIG. 2 depicts exemplary components of the server device 112 of FIG. 1 generated during the Deliverance Phase of a financial dissemination avatar function. These components may be digitally stored in a metaverse 200 residing wholly or partially within server device 112. As noted above, during the initial Declaration Phase an insured individual can define beneficiaries, beneficial events and trigger events. This information may be obtained from one or more of client device 102, one or more third party devices 104, 106, etc. The server device 112 utilizes the information provided in the Declaration Phase to generate corresponding insured person avatars 202, beneficiary avatars 204 and beneficial activities avatars 206 in the Deliverance Phase and stores these avatars within the metaverse 200 on the server device 112.

Insured person avatars 202 can include avatars representing one or more insured individuals. For example, there may be a single insured person avatar representing one insured individual, two insured person avatars representing a married couple, etc.

Beneficiary avatars 204 can include avatars representing all beneficiaries named by the insured person(s), such as, for example, a spouse, children, parents etc. Beneficiary avatars can also represent charitable organizations or other entities to which an insured person has made a bequest.

Beneficial activities avatars 206 can include both one-time activity avatars and recurring activity avatars. Beneficial activities can include, but are not limited to, mortgage pre-closure (prepayment), medical expenses or premium dues, children tuition dues, family vacation expenses, subscription management expenses (e.g., monthly phone bill, etc.) and transfers of ownership (e.g., transfer of perpetual license to software into the beneficiary's name).

Beneficial activities avatars 206 also contain smart contractual information pertaining to the beneficial activities. The smart contractual information can express the terms and obligations of a transaction in a set of computer protocols that enable the execution of the agreement corresponding to the activity. This can include instructions to communicate with the providers of the beneficial activities to oversee the processes necessary to carry out the claims and settlement process on behalf of the beneficiaries and associated products. This can include, for example, partially and/or fully crediting insured sums into a beneficial activities wallet until the time of maturity for the payment. In another example, the smart contractual information can be used to hand off and/or take control of user accounts needed to provide the beneficial activities (such as an account for payment of tuition or medical expenses, access to a mobile phone account, etc.).

Figure 3:
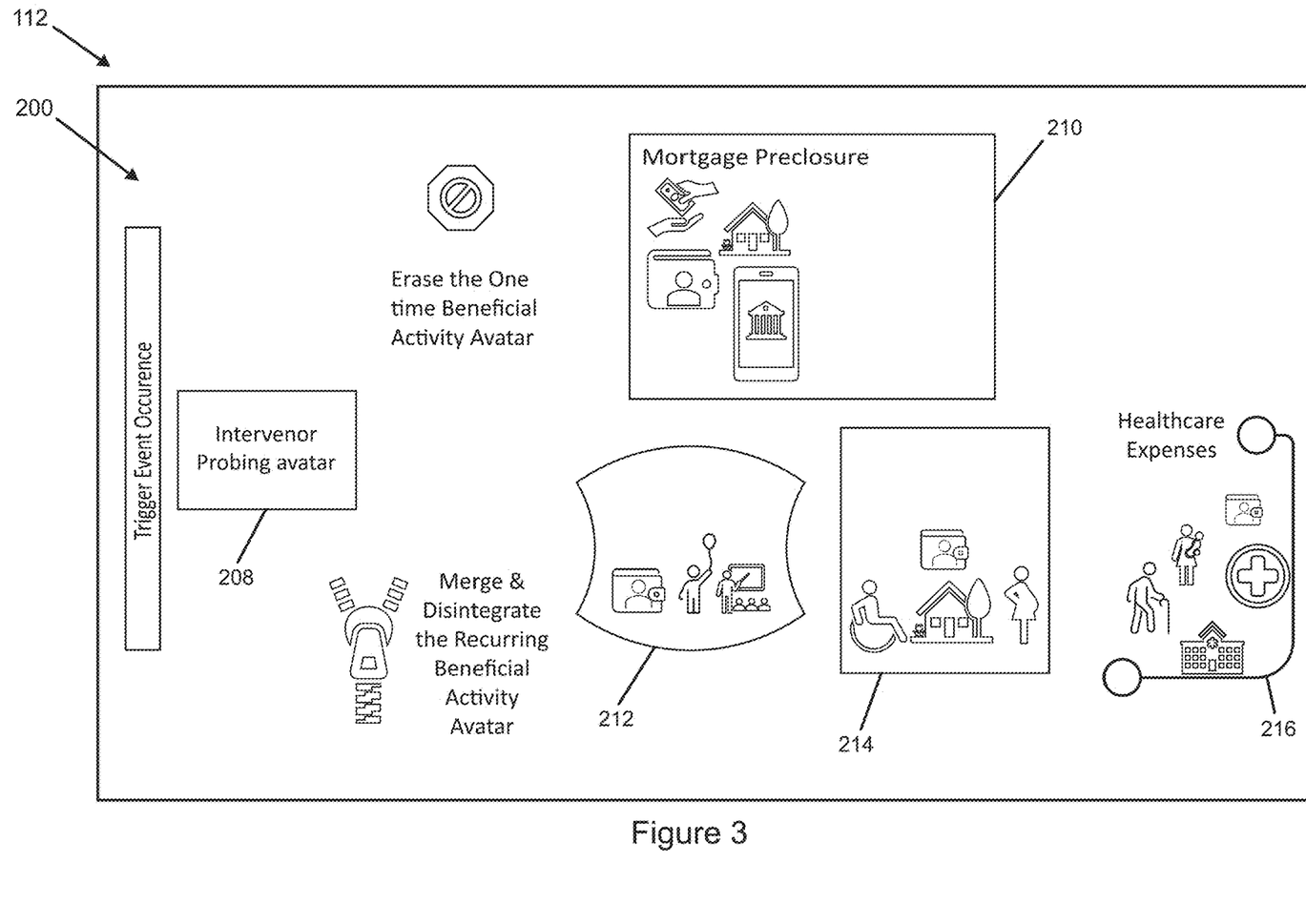
FIG. 3 depicts additional exemplary components of the server device of the system of FIG. 1.

Referring now to FIG. 3, upon the occurrence of a trigger event, the server device 112 enters the Dissemination Phase and can generate an intervenor probing avatar 208 that settles the beneficial activities on behalf of the insured person based on the smart contractual information stored within the beneficial activities avatars. Trigger events can include, for example, death of the insured person, policy maturity, a claim made on a policy and various life events of a beneficiary, such as a beneficiary being born, reaching a certain age, going to or graduating from college, getting married, becoming a parent, etc. Settling a beneficial activity may include calculating amounts or other benefits owed to multiple beneficiaries and facilitating transfer to multiple beneficiaries.

As depicted in FIG. 3, these beneficial activities may have corresponding avatars in the metaverse systems that can include, for example, a mortgage pre-closure activity 210, an education expenses activity 212, a shelter expenses activity 214 and a health care expenses activity 216. For example, in the case of a one-time settlement such as a mortgage pre-closure activity 210, the intervenor probing avatar 208 will be responsible for making a one-time settlement for the mortgage that was pending from the insured person and ensure that the beneficiaries will get the ownership of the property that was covered by the mortgage. Other debts owed by the insured person can similarly by paid out by execution of the smart contractual information to ensure that those debts are covered by treating the lenders or other service providers that are owed money as a beneficiary avatar.

For long term beneficial activities such as an education expenses activity 212, a shelter expenses activity 214 and a healthcare expenses activity 216, the intervenor probing avatar 218 is response for merging the recurring beneficial activity avatar with the long-term beneficial activity. For example, if a beneficial activity avatar 206 indicates that a child's tuition should be paid through age 18, the intervenor probing avatar 208 will merge that information with the education expenses activity 212 to ensure the activity is carried out as dictated by the smart contractual information stored in the beneficial activity avatar 206. Once a beneficial activity is carried out, information contained in the beneficiary avatar can be used to contact the beneficiary and let the beneficiary know of the executed activity and any corresponding information or action needed on the part of the beneficiary.

Upon completion of the beneficial duties, the corresponding financial avatars are erased from the metaverse 200 on the server device 112. For one one-time beneficial activities, the corresponding beneficial activities avatar can be disintegrated upon execution of the beneficial duties. For recurring beneficial activities, the corresponding beneficial activities avatar can be decomposed at a rate that is proportional to the activity execution. Following completion of a beneficial activity, the beneficiary avatar of the beneficiary of the activity is also erased.

If the beneficiary corresponding to the avatar is scheduled to be the recipient of further beneficial activities, a new beneficiary avatar representing that beneficiary can be created with updated information. For example, if a beneficial activity is scheduled to be carried out following the marriage of a beneficiary, following the marriage and the execution of the beneficial activity the previous beneficiary avatar is erased and a new beneficiary avatar is created for the beneficiary with the beneficiary's marital status being updated from single to married. The insured person avatar will remain in the system until all beneficial activities have been carried out, at which point the insured person avatar will be erased as well as all beneficiary avatars and beneficial activities avatars.

Figure 4:
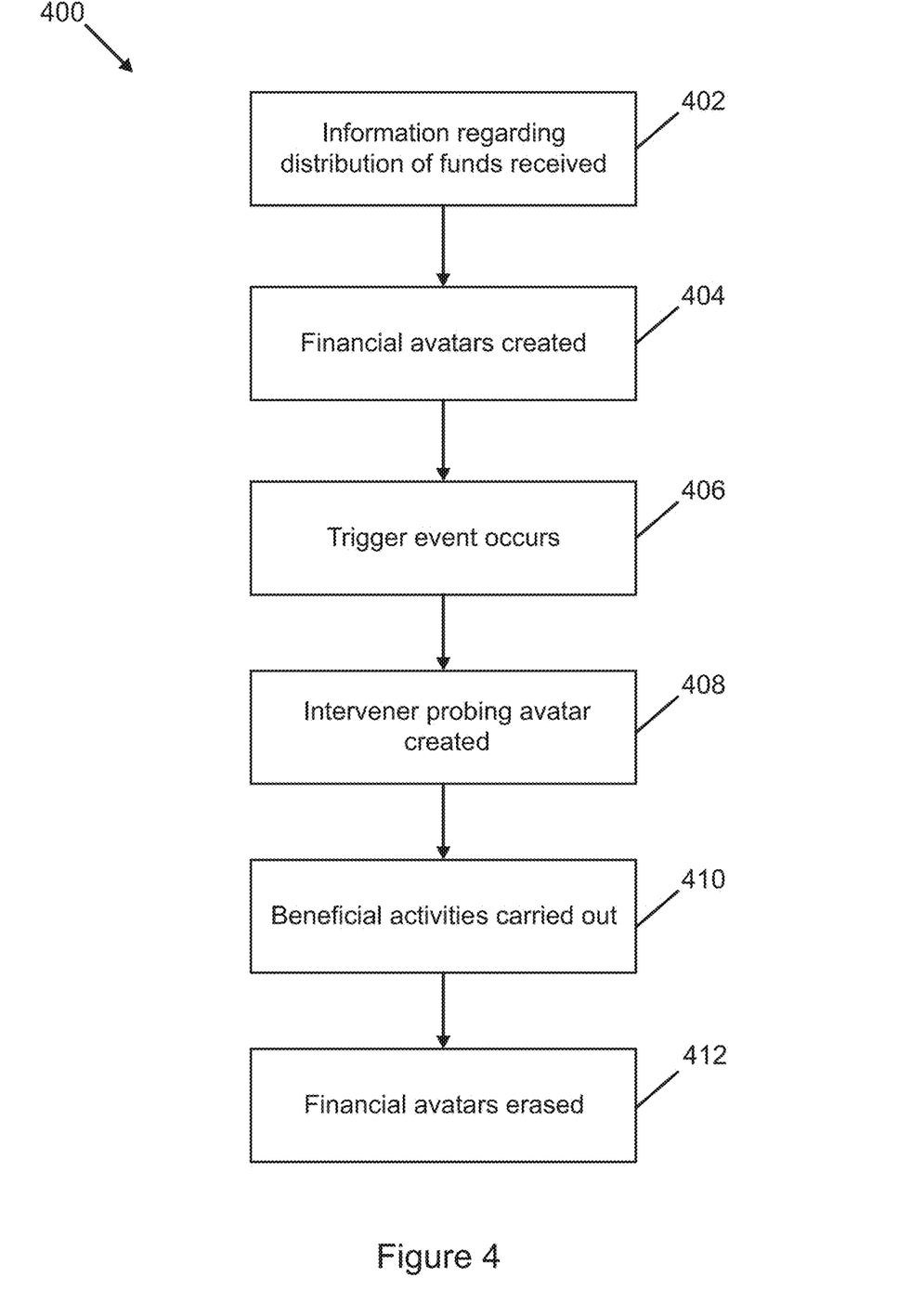
FIG. 4 depicts a flowchart of method steps for use of a financial dissemination avatar function employing the system of FIG. 1.

FIG. 4 depicts a flowchart of method steps 400 for carrying out a beneficial activity for an insured individual with a financial dissemination avatar function employing the system 100 of FIG. 1. At step 402, information is received from an insured person regarding distribution of the person's insured funds. This information can include one or more beneficial activities to be carried out on behalf of one or more beneficiaries upon the occurrence of one or more trigger events. For example, the information may be that a lump sum life insurance payment is to be collected, the person's mortgage is to be paid off and the remainder paid to a beneficiary upon the insured person's death. Financial avatars representing the insured person, the beneficiary, and the beneficial activity are created at step 404. The system determines that a trigger event has occurred at step 406. For example, the system may determine that the insured person has died based on information recorded by the hospital network 106.

Upon occurrence of the trigger event, at step 408 an intervenor probing avatar is created to access the smart contractual information relating to the insured funds to execute the beneficial activities on behalf of the beneficiary. At step 410, the beneficial activities are carried out on behalf of the beneficiary. For example, in this example the intervenor probing avatar can: 1) send a request for payment of the life insurance; 2) send payment paying off the mortgage to the mortgage lender; and 3) send the remainder of the life insurance payout to the beneficiary. These communications between multiple financial institutions can be carried out automatically with no action needed from the beneficiary.

In this example, because all beneficial activities towards all beneficiaries have been carried out, the financial avatars representing the insured person, the beneficiary and the beneficial activities are all erased from the system at step 412. Otherwise, if there are additional beneficiaries and/or additional beneficial activities to be carried out, the beneficial activities avatars corresponding to the life insurance payout can be erased and the beneficiary avatar updated. The system will then await a subsequent trigger event and then proceed in a similar manner.

Although primarily described herein in the context of insurance products, it should be understood that the financial avatar system disclosed herein can be applied to a beneficiary or other individual relating to any other type of financial account and/or financial activity. For example, for an individual that opens a loan account as a student, and then graduates and becomes employed, an initial avatar representing the individual as a student can get disseminated and an avatar of the same person as a professional can be created. In this manner, any life event that happens to an individual associated with an account can cause a current avatar to be disseminated and a new avatar with updated information to be created for that individual.

Figure 5:
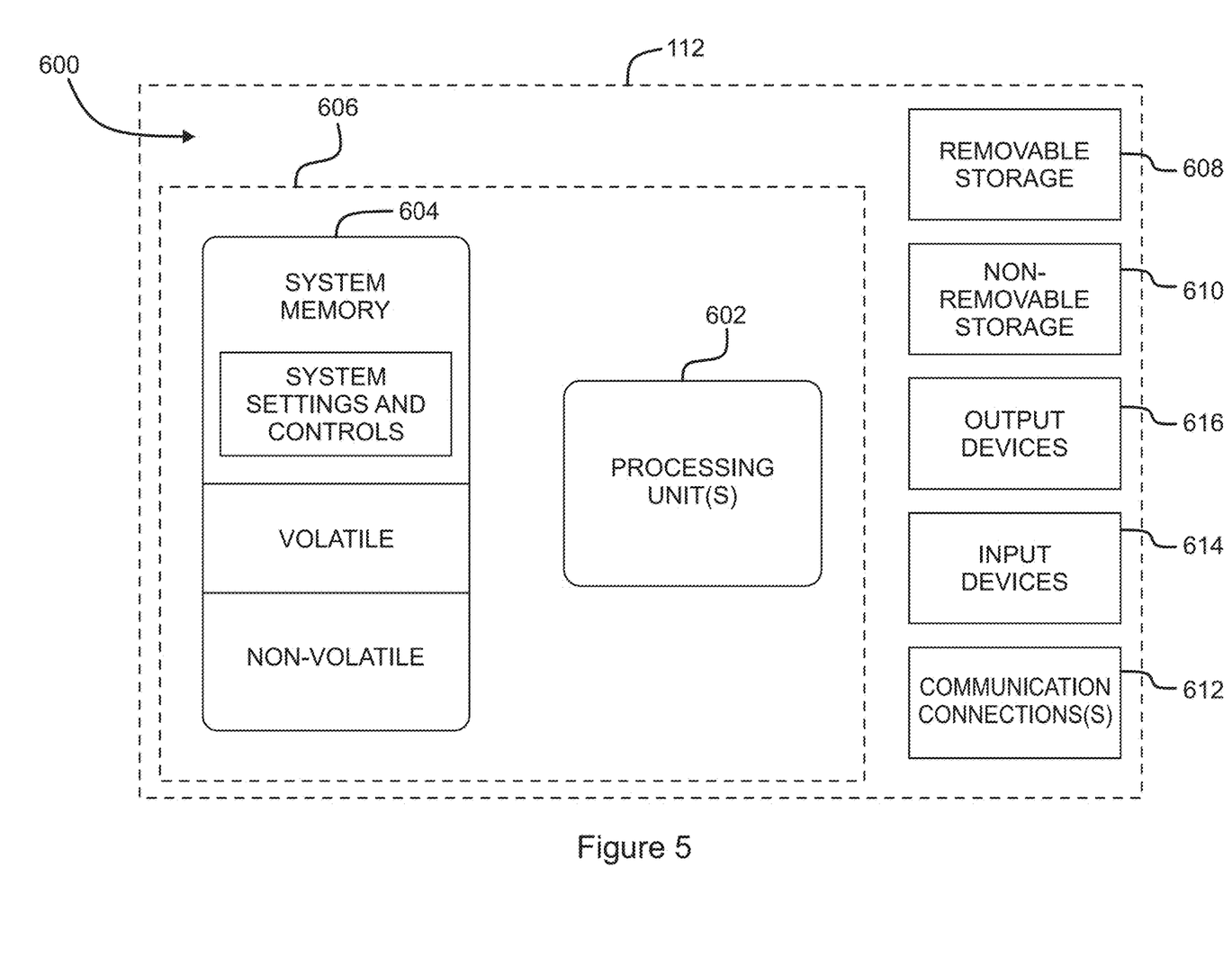
FIG. 5 depicts example components of the server device of FIG. 1.

FIG. 5 depicts one example of the components of the server device 112 on which one or more of the present examples can be implemented. This is only one example of a suitable operating environment and is not intended to suggest any limitation as to the scope of use or functionality. Other well-known computing systems, environments, and/or configurations that can be suitable for use include, but are not limited to, personal computers, server computers, handheld or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, instructions to control the eject the samples, move the stage, or perform other methods disclosed herein) can be volatile (such as RAM), non-volatile (such as ROM, flash memory, etc.), or some combination of the two. This most basic configuration is illustrated in FIG. 7 by dashed line 606. Further, operating environment 600 can also include storage devices (removable, 608, and/or non-removable, 610) including, but not limited to, magnetic or optical disks or tape. Similarly, environment 600 can also have input device(s) 614 such as touch screens, keyboard, mouse, pen, voice input, etc., and/or output device(s) 616 such as a display, speakers, printer, etc. Also included in the environment can be one or more communication connections 612, such as LAN, WAN, point to point, Bluetooth, RF, etc.

Operating environment 600 typically includes at least some form of computer readable media. Computer readable media can be any available media that can be accessed by processing unit 602 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 600 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by operating environment 600 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, operating environment 600 is part of a network that stores data in remote storage media for use by the operating environment 600.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For example, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method, comprising:
    receiving information relating to an insured person, the information including one or more beneficiaries and one or more beneficial activities to be carried out on behalf of the one or more beneficiaries upon occurrence of one or more trigger events;
    generating, in a metaverse system, financial avatars representing the insured person, the one or more beneficiaries and the one or more beneficial activities;
    receiving an indication that a trigger event of the one or more trigger events has occurred, the trigger event corresponding to at least one beneficial activity to be carried out on behalf of at least one beneficiary;
    creating an intervenor probing avatar in the metaverse system in response to the trigger event;
    executing the at least one beneficial activity on behalf of the at least one beneficiary corresponding to the trigger event with the intervenor probing avatar; and
    modifying a financial avatar corresponding to the at least one beneficial activity and a financial avatar corresponding to the at least one beneficiary in the metaverse system following execution of the at least one beneficial activity.

2. The method of claim 1, where the at least one beneficial activity is a one-time activity, and wherein modifying the financial avatar corresponding to the at least one beneficial activity includes erasing the financial avatar from the metaverse system.

3. The method of claim 1, wherein the at least one beneficial activity is a recurring activity, and wherein modifying the financial avatar corresponding to the at least one beneficial activity includes gradually disintegrating the financial avatar from the metaverse system at a rate proportional to execution of the recurring activity.

4. The method of claim 1, wherein modifying the financial avatar corresponding to the at least one beneficiary includes erasing the financial avatar from the metaverse system.

5. The method of claim 4, further comprising determining that the at least one beneficiary is entitled to at least one further beneficial activity, and generating an updated financial avatar corresponding to the at least one beneficiary, wherein the updated financial avatar reflects the trigger event and/or the at least one beneficial activity executed in response to the trigger event.

6. The method of claim 1, wherein upon execution of all beneficial activities to all beneficiaries, a financial avatar corresponding to the insured person is erased from the metaverse system.

7. The method of claim 1, wherein each financial avatar corresponding to a beneficial activity includes smart contractual information for executing the beneficial activity on behalf of at least one of the one or more beneficiaries corresponding to the beneficial activity.

8. The method of claim 7, wherein the intervenor probing avatar accesses the smart contractual information to automatically execute the beneficial activity upon occurrence of the trigger event.

9. The method of claim 1, further comprising receiving information pertaining to the trigger event through distributed ledger technology.

10. The method of claim 1, further comprising communicating information pertaining to the at least one beneficial activity to the at least one beneficiary.

11. A system comprising:
    a processor; and
    a computer-readable medium storing instructions that, when executed by the processor, cause the system to:
    receive information relating to an insured person, the information including one or more beneficiaries and one or more beneficial activities to be carried out on behalf of the one or more beneficiaries upon occurrence of one or more trigger events;
    generate, in a metaverse system, financial avatars representing the insured person, the one or more beneficiaries and the one or more beneficial activities;
    receive an indication that a trigger event of the one or more trigger events has occurred, the trigger event corresponding to at least one beneficial activity to be carried out on behalf of at least one beneficiary;
    create an intervenor probing avatar in the metaverse system in response to the trigger event;
    execute the at least one beneficial activity on behalf of the at least one beneficiary corresponding to the trigger event with the intervenor probing avatar; and
    modify a financial avatar corresponding to the at least one beneficial activity and a financial avatar corresponding to the at least one beneficiary in the metaverse system following execution of the at least one beneficial activity.

12. The system of claim 11, where the at least one beneficial activity is a one-time activity, and wherein the system modifies the financial avatar corresponding to the at least one beneficial activity by erasing the financial avatar from the metaverse system.

13. The system of claim 11, wherein the at least one beneficial activity is a recurring activity, and wherein the system modifies the financial avatar corresponding to the at least one beneficial activity by gradually disintegrating the financial avatar from the metaverse system at a rate proportional to execution of the recurring activity.

14. The system of claim 11, wherein the system modifies the financial avatar corresponding to the at least one beneficiary by erasing the financial avatar from the metaverse system.

15. The system of claim 14, further comprising instructions that, when executed by the processor, cause the system to determine that the at least one beneficiary is entitled to at least one further beneficial activity, and to generate an updated financial avatar corresponding to the at least one beneficiary, wherein the updated financial avatar reflects the trigger event and/or the at least one beneficial activity executed in response to the trigger event.

16. The system of claim 11, further comprising instructions that, when executed by the processor, cause the system, upon execution of all beneficial activities to all beneficiaries, to erase a financial avatar corresponding to the insured person from the metaverse system.

17. The system of claim 11, wherein each financial avatar corresponding to a beneficial activity includes smart contractual information for executing the beneficial activity on behalf of at least one of the one or more beneficiaries corresponding to the beneficial activity.

18. The system of claim 17, further comprising instructions that, when executed by the processor, cause the intervenor probing avatar to access the smart contractual information and automatically execute the beneficial activity upon occurrence of the trigger event.

19. The system of claim 11, further comprising instructions that, when executed by the processor, cause the system to receive information pertaining to the trigger event through distributed ledger technology.

20. The system of claim 11, further comprising instructions that, when executed by the processor, cause the system to communicate information pertaining to the at least one beneficial activity to the at least one beneficiary.

\* \* \* \* \*